March 21, 1961　　　TATSUYA TAKAGI　　　2,976,031
VIBRATION DAMPER OF AIR CUSHION FOR VEHICLES
Filed July 24, 1959　　　　　　　　　　　　　4 Sheets-Sheet 1

INVENTOR.
TATSUYA TAKAGI
BY
Leon M. Strauss

United States Patent Office 2,976,031
Patented Mar. 21, 1961

2,976,031

VIBRATION DAMPER OF AIR CUSHION FOR VEHICLES

Tatsuya Takagi, 63 Araebisu-machi, Nishinomiya-shi, Japan

Filed July 24, 1959, Ser. No. 829,344

Claims priority, application Japan Apr. 23, 1959

3 Claims. (Cl. 267—15)

This invention relates to a vibration damper for an air cushion adapted to be mounted on a vehicle, such as a passenger car, equipped with air cushion having a natural vibration of comparatively lower frequency, wherein the natural vibration of the air cushion is precisely damped as well as damping vibrative external forces having higher frequency than that of said natural vibration due to, for instance, sudden raggedness of road surface.

It is a defect of a conventional vibration damper to disturb free movement of a spring when a wheel falls into a steep dent of road surface, inasmuch as the damping force will disturb the fall of the wheel and disturb the contact of wheel with the road, while at the same time, the extension force of the supporting spring is braked and the ability of the spring is disturbed.

The main object of the present invention is to eliminate such a defect completely and to provide a vibration damper operative of strong braking force, assuring a comfortable ride of a passenger car.

With these and other objects in view, the invention consists in certain novel features of construction of parts as will be more fully hereinafter described and pointed out in the claims.

Figure 1:
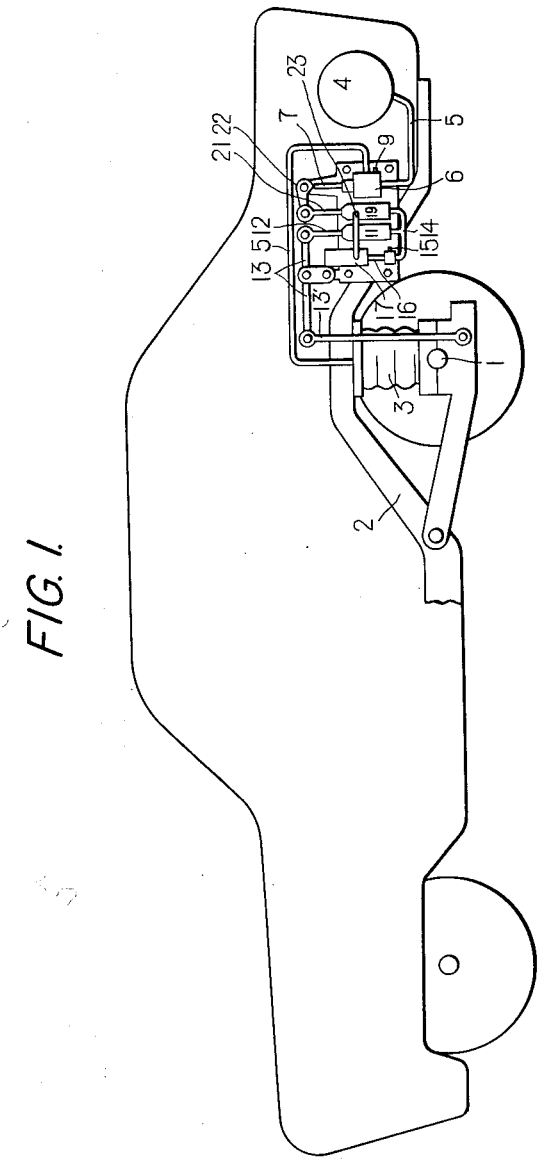
Fig. 1 is a front view of a vibration damper for an air cushion, according to the invention, which is mounted on a motor car.
Figure 2:
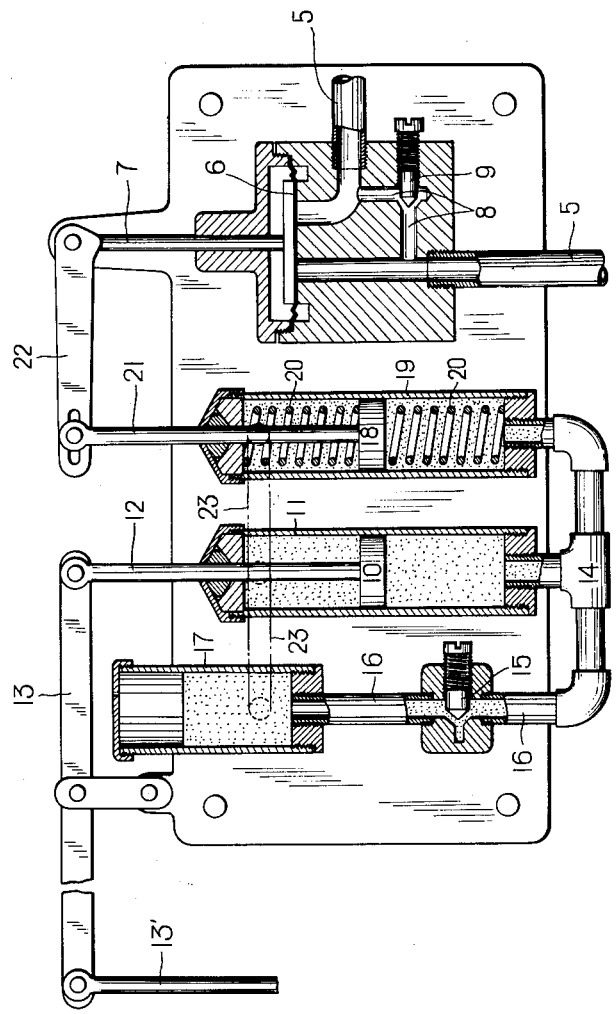
Fig. 2 is a front view showing inner constructions in longitudinal section at respective centers of the driving piston, driven piston, air valves and mechanisms relating thereto, comprising main parts of the vibration damper shown in Fig. 1.

In the drawings, 1 is a wheel axle, 2 is a chassis, 3 is an air bellows disposed between the axle 1 and the chassis 2 to act as a supporting spring, 4 in an air vessel connected with the bellows 3 through an air pipe 5 for the purpose of lowering the constant of the spring, thus lowering the frequency of natural vibration of the vehicle, 6 is an air valve of diaphragm type disposed at a part of the air pipe 5, 7 is a valve rod fixed to upper portion of the air valve, 8 is a bypass provided aside to the air valve 6, on a portion of which by-pass a throttle valve 9 is provided.

10 is a driving piston, in cyinder 11 thereof oil is filled and a rod 12 is connected to a fixing seat of the axle 1 through lever 13 and link 13', a branch pipe 14 is disposed at lower portion of the cylinder 11 and one end of the branch pipe is connected to the lower bottom of an oil sump 17 through an oil pipe 16 provided with an intermediate throttle valve 15.

18 is a driven piston disposed aside to the driving piston 10. On upper and lower portions within a cylinder 19 thereof compression springs 20, 20 are seated for the purpose of supporting the driven piston 18 normally at a neutral position. Connected to the lower portion of the cylinder 19 is a branch pipe 14 and the valve rod 7 is connected to a rod 21 through a cam arm 22. An oil pipe 23 is provided for connecting respective upper portions of the oil sump 17, the cylinders 11 and 19.

The shape of the cam arm 22 is preferably so formed that a slight eccentric portion is formed at a pointed head facing to the valve rod 7 to close the air valve 6 at the neutral position of the driven piston 18 and within a range of slight shift thereof and to open the valve 6 at other positions.

The present inventive idea is adaptable to a vehicle on the assumption that the vehicle has a natural vibration of comparatively lower frequency, so that the capacity of the air vessel 4 is fairly larger than that of the air bellows 3 and the weight of wheels and accessories thereof, i.e. the weight below chassis springs, is considerably lighter than the weight of vehicle body, i.e. the weight above chassis springs, and that relative acceleration and velocity between wheel and body due to repelling power of supporting spring and weight of wheel, when the wheel falls into a steep dent of road surface, are considerably larger than relatively slower acceleration and velocity between wheel and body due to natural vibration of the vehicle.

The air valve 6 provided on the pipe connection between the air bellows 3 and the air vessel 4 is closed when the velocity of up and down motion of the wheel is slow and is opened only when the velocity thereof becomes larger than a certain value and the amplitude of said motion is larger than a certain value.

Device according to the invention consists of aforementioned parts and operation thereof is explained as follows.

Figure 3:
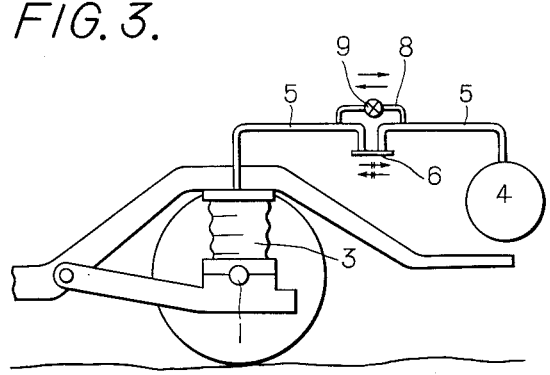
Fig. 3, Fig. 4, Fig. 5 and Fig. 6 are explanatory drawings illustrating the operation of the vibration damper according to the invention, under various running states of a vehicle.

When a vehicle is running on a level road, as shown in Fig. 3, slow or small amplitude up-and-down motion of the wheel will make the driving piston 10 rise and fall through the lever 13 and link 13'. In this case, the oil below the driving piston 10 will pass through the throttle valve 15 and flow into the oil sump 17, thus the driven piston 18 will not be actuated yet, so that the air valve 6 will keep the air pipe 5 in closed state.

Figure 4:
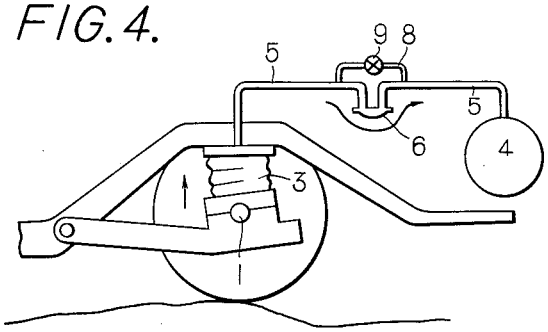

When the vehicle runs on a steep protrusion of road surface from the level road, as shown in Fig. 4, sudden rise of the wheel will make the driving piston 10 fall suddenly downward through the lever 13 and link 13'. In this case, the oil below the driving piston 10 cannot flow rapidly into the oil sump 17 against the resistance of the throttle valve 15, so that the oil, turning the flow direction thereof, will act below the driven piston 18 and raise the same upward thus turning the cam arm 22 through rod 21 and making the pointed head thereof withdraw from the top portion of the valve rod 7, so that the air valve 6 is opened and the air in the air bellows 3 will flow into the air vessel 4 without raising suddenly its pressure, thus sudden shocks from the road surface will be avoided.

Figure 5:
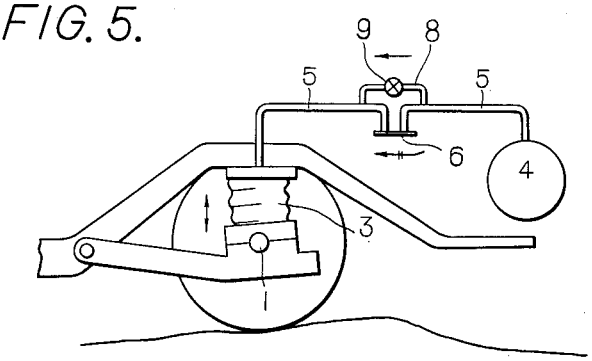

In the next moment, as shown in Fig. 5, as the relative velocity of the wheel to the chassis gets near zero, the oil pressure below the piston 10 is gradually lowered, and the oil below the driven piston 18 will flow into the oil sump 17 through the throttle valve 15 by means of the compression spring 20; thus the piston will restore its neutral position and the air valve 6 is closed through the arm 21 and the cam rod 22; so that the pressed air in the air vessel 4 is gradually returned to the air bellows 3 through the by-pass 8, thus the air bellows 3 will never repel rapidly the chassis.

Figure 6:
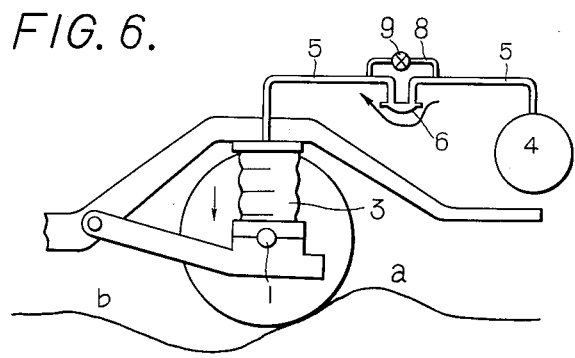

In case the vehicle is running in high speed on a road surface involving continuously a steep protrusion $a$ and a steep dent $b$ or a level surface to a steep dent, as shown in Fig. 6, it is unavoidable that those vehicles provided with usual oil damper have a tendency that the wheel will jump from *a* to *b* without contacting the road surface to brake the sudden falling of the wheel. In such a case, it is required that the supporting spring will display a repelling power of the spring between the wheel and the chassis, making the wheel rapidly contact the road surface, thus the fall of chassis will be checked. Namely, in such a case, it is desirable that the damper has no damping power.

In the device of the invention, as soon as the wheel will begin to fall from the top of road surface with high velocity, the driving piston 10 will be rapidly raised, however, in the portion below the piston, it is difficult to suck the oil therein rapidly from the oil sump 17 due to the resistance of the throttle valve 15, so that the oil below the driven piston 18 is sucked therein, making this piston fall down, resulting in opening the air valve 6. Then, the air in the air vessel 4 is rapidly introduced into the air bellows 3, so that air pressure therein is not rapidly decreased, thus the wheel will rapidly contact the road surface as well as the supporting action to check the fall of the chassis will be strongly displayed.

There are other cases, wherein the natural vibration will be caused or remain in the chassis due to various vibrative external forces. However, in such cases, the relative velocity of axle portion to chassis is comparatively slower so that the air valve 6 is always closed and the vibration is decreased, and if other natural vibrations of comparatively higher frequency due to the air capacity of the air bellows 3, remain, these are limited to the case of small amplitude, and uncomfortable ride is never given. (In case of large amplitude, every part of this device of the invention will act rapidly.)

In the known vibration damper of such type that free movement of the supporting spring is damped, there are defects that when the wheel is facing a steep dent of the road surface, falling down of the wheel is braked and contact thereof with the road surface is checked as well as the ability of the supporting spring is injured. And, in the damping devices such as usual oil dampers, there are defects that the damping power is decreased as the natural vibration of the vehicle becomes lower, so that if a strong damping power is given to effect complete damping compulsorily, aforementioned bad effects of insufficient contact of the wheel with road surface and of disturbance on bearing ability of the supporting spring etc., are caused in case of high frequency vibration.

On the contrary, the device according to the invention is contrived to eliminate aforementioned various defects, so that a strong damping power may be effectuated, thus slow natural vibration of comparatively lower frequency is surely damped, bounding of the vehicle during high speed running is strongly checked, contact of the wheel with road surface upon facing a steep dent is improved, and the ability of the supporting spring is displayed to the maximum, then such effects giving a comfortable ride and an excellent steering may be obtained consequently.

Having thus described the invention, what is claimed as new and desired to be secured by Letters Patent is:

1. A vibration damper for vehicles connected with an air bellows disposed between a chassis and an axle of a wheel, comprising in combination an air vessel containing compressed air, an air valve assembly provided in a comparatively large passage connecting said bellows and said air vessel, a throttle valve provided in a by-pass of said valve within said assembly, a driving piston within an oil cylinder, a motion transmitting means between a rod of said driving piston and said axle, a driven piston within an oil cylinder normally keeping its neutral position by springs, an oil sump for both of said cylinders, an oil passage connecting the bottom of the driving cylinder with the bottom of driven cylinder and the bottom of driving cylinder with said oil sump, an oil throttle valve provided in said oil passage between said oil sump and said driving cylinder, and a cam arm operatively engaged between a valve rod of said air valve and a rod of said driven piston, wherein said cam arm is so formed that it closes said air valve when said driven piston lies in its neutral position and opens the same in other positions, said oil throttle valve being so adjusted that said driven piston opens said air valve only when the velocity of the driving piston is larger than a certain value, so that the damping action is effective only when the relative velocity of the wheel to the chassis is smaller than the value due to the natural vibration of the vehicle.

2. A vibration damper for vehicles according to claim 1, wherein the shape of said cam arm is preferably so formed that a slight eccentric portion is formed at a head facing said valve rod to close said air valve at the neutral position of said driven piston and within a range of slight shift thereof while permitting said air valve to open at other positions.

3. A vibration damper for vehicles according to claim 1, wherein said throttle valve has a relatively small passage therein as compared with said comparatively large passage.

References Cited in the file of this patent

UNITED STATES PATENTS

| | | |
|---|---|---|
| 2,115,072 | Hunt et al. | Apr. 26, 1938 |
| 2,150,390 | Mercier | Mar. 14, 1939 |